United States Patent [19]

Okamoto

[11] Patent Number: 5,241,683
[45] Date of Patent: Aug. 31, 1993

[54] DATA FLOW TYPE INFORMATION PROCESSOR

[75] Inventor: Toshiya Okamoto, Kyoto, Japan

[73] Assignee: Sharp Kabushiki Kaisha, Osaka, Japan

[21] Appl. No.: 726,402

[22] Filed: Jul. 5, 1991

[30] Foreign Application Priority Data

Jul. 11, 1990 [JP] Japan .................... 2-185088

[51] Int. Cl.⁵ .............................................. G06F 9/38
[52] U.S. Cl. ................................. 395/800; 364/232.22; 364/931.11
[58] Field of Search ................... 364/DIG. 1, DIG. 2; 395/800

[56] References Cited

U.S. PATENT DOCUMENTS

| | | | |
|---|---|---|---|
| 4,965,715 | 10/1990 | Yoshida | 395/375 |
| 4,972,315 | 11/1990 | Yamasaki | 395/400 |
| 5,021,947 | 6/1991 | Campbelll | 395/700 |
| 5,043,880 | 8/1991 | Yoshida | 395/375 |
| 5,093,915 | 3/1992 | Yoshida | 395/800 |
| 5,115,510 | 5/1992 | Okamoto | 395/775 |
| 5,117,499 | 5/1992 | Miyata | 395/800 |
| 5,125,097 | 6/1992 | Okamoto | 395/800 |

OTHER PUBLICATIONS

"Model of Data Drive Processor Having Data Transfer Path without Over Flow" Collected Papers on the Lectures of 34th National Conference of Information Processing Society, Shin-ichi Yoshida et al.

*Primary Examiner*—David Y. Eng

[57] ABSTRACT

A data flow type information processor includes first and second program storing portions, a merging portion, a data pair detecting portion and first and second operation processing portions. Each of the first and the second program storing portions stores a data flow program and outputs a data packet including destination information and instruction information read from the data flow program based on an input data packet. The merging portion performs arbitration between data packets output from said first and second program storing portions. The data pair detecting portion receives a data packet output from the merging portion to detect two data packets having the same destination information. Each of the first and the second operation processing portions receives a data packet output from the data pair detecting portion and performs an operation processing based on the instruction information included in the data packet to output a data packet including the data indicative of the operation result to the corresponding program storing portion.

15 Claims, 17 Drawing Sheets (1 INPUT INSTRUCTION:0%, 2 INPUT INSTRUCTION:100%, ALL INSTRUCTIONS HAVE COPY/CONSTANT)

(1 INPUT INSTRUCTION:100%, 2 INPUT INSTRUCTION:0%, ALL INSTRUCTIONS HAVE COPY/CONSTANT)

| DESTINATION FIELD | INSTRUCTION FIELD | DATA 1 FIELD | DATA 2 FIELD |
|---|---|---|---|

(1 INPUT INSTRUCTION:0%, 2 INPUT INSTRUCTION:100%, ALL INSTRUCTIONS HAVE COPY/CONSTANT)

(1 INPUT INSTRUCTION:100%, 2 INPUT INSTRUCTION:0%, ALL INSTRUCTIONS HAVE COPY/CONSTANT)

DATA FLOW TYPE INFORMATION PROCESSOR

CROSS-REFERENCE TO RELATED APPLICATION

This application is related to copending application Ser. No. 659,690, filed Feb. 25, 1991, commonly assigned with the present invention.

BACKGROUND OF THE INVENTION

1. Field of the Invention

The present invention relates generally to data flow type information processors, and more particularly, it relates to data flow type information processors wherein a plurality of instructions are simultaneously driven by data and a method of operating the same.

2. Description of the Background Art

In a conventional von Neuman type computer, various instruction are stored as program in program memories in advance, and addresses in the program memories are sequentially designated by a program counter to sequentially read the instructions to be executed.

A data flow type information processor is one type of non-von Neuman type computers without a concept of sequential execution of instructions by a program counter. Such data flow type information processor employs architecture based on a parallel processing of instructions. In the data flow type information processor, collection of data which are objects of an operation renders an instruction executable and a plurality of instructions are simultaneously driven by the data, so that program is executed in parallel in accordance with the natural flow of the data. As a result, it is considered that the time required for the operation is significantly reduced.

FIG. 20 is a block diagram showing one example of a structure of a conventional data flow type information processor. FIG. 21 is a diagram showing one example of a field arrangement of a data packet to be processed by the information processor.

A data packet shown in FIG. 21 includes a destination field, an instruction field, a data 1 field, and a data 2 field. The destination field stores destination information, the instruction field stores instruction information, and the data 1 field or the data 2 field stores operand data.

The information processor shown in FIG. 20 includes a program storing portion 1, a data pair detecting portion 2 and an operation processing portion 3. The program storing portion 1 stores a data flow program 10 shown in FIG. 22. Each row of the data flow program 10 includes destination information 11, instruction information 12, copy presence/absence information 13 and constant presence/absence information 14. Constant "presence" information indicates that the subsequent row stores constant data 15. The program storing portion 1 reads, as shown in FIG. 22, destination information 11, instruction information 12, copy presence/absence information 13 and constant absence/presence information 14 of the data flow program 10 by addressing based on the destination information of an input data packet, stores the destination information 11 and the instruction information 12 in the destination field and the instruction field of the data packet, respectively, and outputs the data packet.

The data pair detecting portion 2 queues data packets output from the program storing portion 1. More specifically, when the instruction information indicates a 2 input instruction, the data pair detecting portion 2 detects two different data packets having the same destination information, stores operand data of one of the data packets (the contents of the data 1 field shown in FIG. 21) in the data 2 field of the other data packet, and outputs the other data packet. When the instruction information indicates a 1 input instruction, an input data packet is output without modification.

The operation processing portion 3 performs an operation processing based on instruction information with respect to a data packet output from the data pair detecting portion 2, stores the result of the operation processing in the data 1 field of the data packet, and outputs the data packet to the program storing portion 1.

The program storing portion 1 and the data pair detecting portion 2 are coupled to each other by a two data transmission paths 4a and 4b. A data packet output from the program storing portion 1 is selectively transmitted by either the data transmission paths 4a or 4b according to whether the operand data is right operand data or left operand data in the operation processing. In addition, the data pair detecting portion 2 and the operation processing portion 3 are coupled to each other by a data transmission path 5 and the operation processing portion 3 and the program storing portion 1 are coupled to each other by a data transmission path 6.

As the data packets continue to circulate through the program storing portion 1, the data pair detecting portion 2, the operation processing portion 3 and the program storing portion 1 . . . , the operation processing proceeds in accordance with the data flow program 10 stored in the program storing portion 1.

FIG. 23 is a diagram showing one example of a data flow graph. In FIG. 23, nodes N1, N2 and N3 denote instructions of addition, multiplication and subtraction, respectively. Nodes N4 and N5 indicate instructions of increment and decrement, respectively. The instructions of the nodes N1, N2 and N3 are 2 input instructions and the instructions of the nodes N4 and N5 are 1 input instructions. The operation result of the nodes N1 is referred to by the nodes N2 and N3. In this case, a copy processing is performed in the program storing portion 1.

The copy processing will be now described. First, the contents of a row addressed based on the destination information of an applied data packet are read out from the data flow program. At this time, when the copy presence/absence information 13 indicates "absence", a data packet is output with the contents of its destination field and instruction field updated to complete the processing.

Conversely, when the copy presence/absence information 13 indicates "presence", a data packet is output with the contents of its destination field and instruction field updated, and destination information 11, instruction information 12, copy presence/absence information 13, and constant presence/absence information 14 stored in the subsequent row are read out. When the copy presence/absence information 13 read out from the subsequent row indicates "absence", the same data as that of the input data packet is stored in the data 1 field of another data packet and the destination information and the instruction information which have been just read out are respectively stored in the destination field and the instruction field of said another data packet, and said another data packet is output. If the copy presence/absence information 13 read out from the subsequent row indicates "presence", the same copy processing will be further repeated.

When the constant absence/presence information 14 indicates "presence", a constant outputting processing will be carried out for reading constant data 15 stored in the subsequent row.

In the above described information processor, when a copy processing or a constant outputting processing is once performed, a flow rate of data packets input to the program storing portion 1 to data packets output from the program storing portion 1 becomes 1:2 without fail. Here, the flow rate of the data packets represents the number of data packets passing through the respective portions per hour.

FIGS. 24 and 25 show a flow rate of data packets on each transmission path, supposing that the flow rate of data packets on the transmission path 6 is 1.

FIG. 24 shows flow rates of data packets in a case where the data flow program includes 0% 1 input instruction and 100% 2 input instructions and all the instructions include a copy processing or a constant outputting processing. When a copy processing or a constant outputting processing is carried out at the program storing portion 1, the flow rate of both of the data transmission paths 4a and 4b becomes 1. When the instruction information indicates a 2 input instruction, each data packet in the data pair detecting portion 2 waits for a data packet which is to be paired with to be input, whereby data packets are output at a flow rate of 0.5 for the flow rate 1 of the data transmission paths 4a and 4b. As a result, a data packet with a flow rate of 1 is input to the operation processing portion 3.

FIG. 25 is a diagram showing flow rates of data packets in a case (a worst case) where 100% 1 input instructions and 0% 2 input instruction are included and all the instructions include a copy processing or a constant outputting processing. A copy processing or a constant outputting processing carried out in the program storing portion 1 makes the flow rates of both the data transmission paths 4a and 4b1. When the instruction information indicates a 1 input instruction, each data packet does not wait for a data packet to be paired in the data pair detecting portion 2, whereby a data packet with a flow rate of 1 is output for each of the data transmission paths 4a and 4b with a flow rate of 1. The maximum flow rate of the data transmission path 5 is 1 and therefore, the operation processing portion 3 receives only a data packet with a flow rate of 1 as in the case shown in FIG. 24.

As described above, a conventional data flow type information processor performs a processing at its highest operation rate when a data flow program to be executed includes 100% 2 input instructions. Therefore, more 1 input instructions included in a data flow program prevents the data flow program from achieving its original processing efficiency.

In addition, a data packet circulating through the respective processing portions in the information processor based on the order of execution of the data flow program stored in the program storing portion 1 is processed in the form shown in FIG. 21, so that a width of a data line (a data transmission path) connecting the respective processing portions has an unnecessary margin.

That is, read of a data flow program from the program storing portion 1 fundamentally requires only the contents of a destination field in a data packet which packet designates subsequent instruction information and does not require the contents of an instruction field, a data 1 field and a data 2 field of the data packet. In addition, the operation processing portion 3 also requires the contents of the instruction field, the data 1 field and the data 2 field of the data packet but not the contents of the destination field of the data packet. This prevents an effective use of area in an arrangement of an information processor.

SUMMARY OF THE INVENTION

An object of the present invention is to provide a data flow type information processor capable of obtaining a high processing efficiency even when a data flow program includes many 1 input instructions, and a method of operating such device.

Another object of the present inventions is to provide a data flow type information processor which can be physically made smaller in scale and is capable of obtaining a high processing efficiency even when a data flow program includes many 1 input instructions and a method of operating such device.

A further object of the present invention is to provide a compact data flow type information processor capable of obtaining a high processing efficiency when in reading a plurality of pairs of information from a program storing portion as in a case of a copy processing or a constant output processing and a method of operating such device.

The data flow type information processor according to the present invention includes first and second program storing portions, a merging portion, a data pair detecting portion and first and second operation processing portions.

The first and the second program storing portions store a data flow program and reads at least subsequent destination information and instruction information from the data flow program based on the destination information included in an input data packet, thereby outputting a data packet including these destination information and instruction information. The merging portion performs arbitration between the data packets output from the first and the second program storing portions.

The data pair detecting portion includes first and second input portions receiving data packets output from the merging portion and first and second outputting portions for outputting the data packets, thereby detecting two data packets having the same destination information.

The first and the second operation processing portions respectively receive data packets output from the first and the second output portions of the data pair detecting portion, and execute an operation processing with respect to the data included in the data packets based on the instruction information included therein, thereby applying data packets including the data indicative of the operation results to the first and the second program storing portions, respectively.

In the data flow type information processor provided with two program storing portions and two operation processing portions, data output from the output portion of the data pair detecting portion is applied to the two operation processing portions, whereby a processing efficiency twice that of a conventional data flow type information processor can be obtained even if the data flow program includes 100% 1 input instructions and all the instructions include a copy processing or a constant outputting processing.

As described in the foregoing, it is possible to achieve a processing efficiency that the program originally has even if a data flow program includes many 1 input instructions. Therefore, a processing efficiency of the data flow type information processor can be improved.

According to another aspect of the present invention, a data flow type information processor includes first and second program storing portions, first and second operation processing portions, first, second and third merging portions, a data pair detecting portion and a supply portion.

The first and the second program storing portions store a data flow program and reads at lest the subsequent destination information and instruction information from the data flow program based on input destination information. The first and the second operation processing portions are provided corresponding to the first and the second program storing portions, respectively, and execute an operation processing with respect to input data based on input instruction information to output data indicative of the operation result.

The first merging portion merges destination information and instruction information read from the first program storing portion with data output from the first operation processing portion. The second merging portion merges destination information and instruction information read from the second program storing portion with data output from the second operation processing portion. The third merging portion performs arbitration between the outputs from the first and the second merging portions.

The data pair detecting portion receives destination information and instruction information output from the third merging portion together with the data corresponding to these information and outputs one or a plurality of data corresponding to the same destination information together with the destination information and the instruction information. The supply portion supplies destination information, out of the outputs from the data pair detecting portion, to the first or the second program storing portion and applies instruction information and data to the corresponding operation processing portion.

The first merging portion applies other information read simultaneously with destination information and instruction information from the first program storing portion, to the third merging portion in parallel with the destination information and the instruction information. The second merging portion applies other information read simultaneously with destination information and instruction information from the second program storing portion, to the third merging portion in parallel with the destination information and the instruction information. The third merging portion applies other information supplied in parallel with the destination information and the instruction information from the first or the second merging portion, to the data pair detecting portion in parallel with the destination information and the instruction information.

The information processor is provided with a supply portion for separating destination information from instruction information and data, and first, second and third merging portions for coupling the destination information, the instruction information and the data separated by the supply portion, thereby enabling a minimum amount of information to be transferred to each processing portion. Therefore, a width of a data line (data transmission path) connecting the respective processing portions can be reduced.

In addition, when other information is read simultaneously with destination information and instruction information from the first or the second program storing portion, the first or the second merging portion and the third merging portion supply those information to the data pair detecting portion in parallel. It is therefore possible to couple, without applying additional identification information to the separated destination information and instruction information, the destination information with the corresponding instruction information and data.

As described above, in the information processor wherein each processing portion receives the minimum amount of data packets required for the processing portion, a width of a data line connecting the respective processing portions can be reduced.

In addition, other information is read simultaneously with destination information and instruction formation from the first or the second program storing portion, these information are transferred to the data pair detecting portion in parallel. It is therefore possible to couple separated destination information, instruction information and data with each other without using additional identification information.

As a result, a packet size can be reduced to reduce a chip area of a large-scale integrated information processor.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
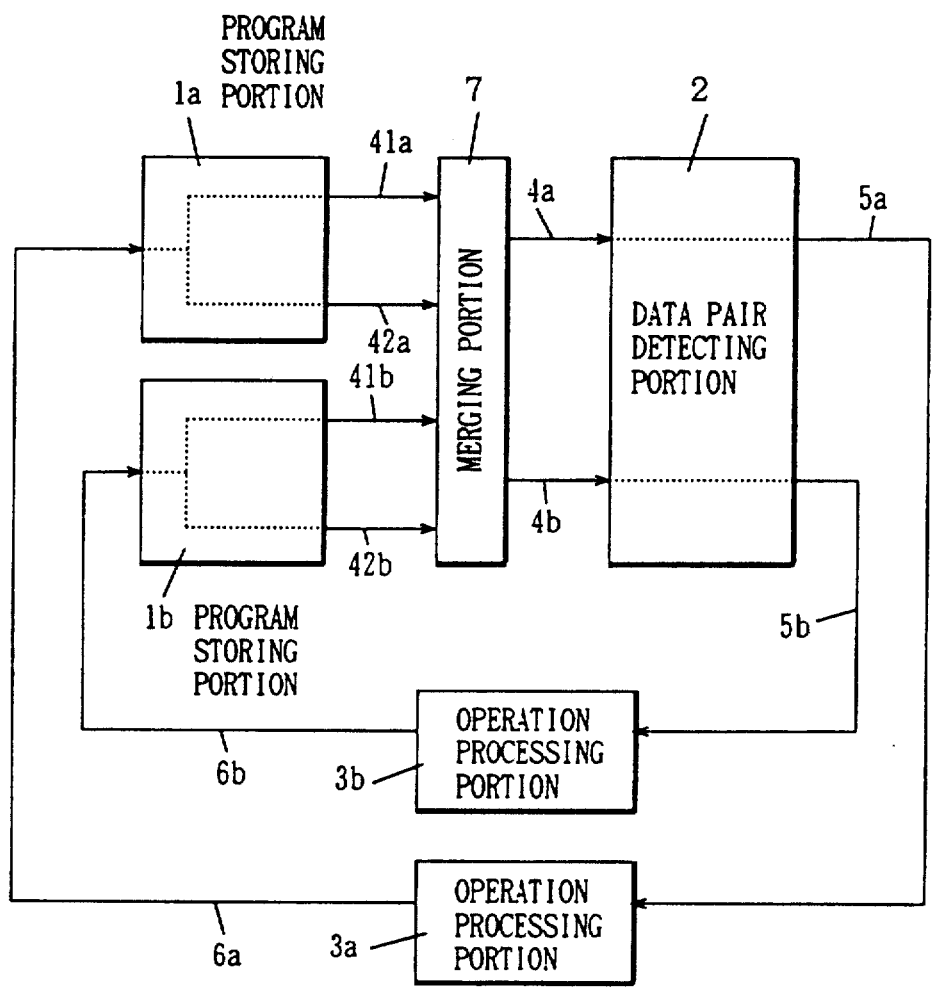
FIG. 1 is a block diagram showing an arrangement of a data flow type information processor according to one embodiment of the present invention.

FIG. 1 is a block diagram showing an arrangement of a data flow type information processor according to an embodiment of the present invention.

In FIG. 1, the data flow type information processor comprises first and second program storing portions 1a and 1b, a merging portion 7, a data pair detecting portion 2 and first and second operation processing portions 3a and 3b. An arrangement and operation of each of the first and the second program storing portions 1a and 1b are the same as those of the program storing portion 1 shown in FIG. 20. An arrangement and operation of the data pair detecting portion 2 are the same as those of the data pair detecting portion 2 shown in FIG. 20. An arrangement and operation of each of the first and the second operation processing portions 3a and 3b are the same as those of the operation processing portion 3 shown in FIG. 20.

The first program storing portion 1a and the merging portion 7 are coupled to each other by means of two data paths 41a and 42a. The second program storing portion 1b and the merging portion 7 are coupled to each other by means of two data paths 41b and 42b. The data pair detecting portion 2 has two input ports and two output ports. The merging portion 7a and the two input ports of the data pair detecting portion 2 are coupled to each other by means of two data transmission paths 4a and 4b. One of the output ports of the data pair detecting portion 2 and the first operation processing portion 3a are coupled to each other by means of a data transmission path 5a and the other output port of the data pair detecting portion 2 and the second operation processing portion 3b are coupled to each other by means of a data transmission path 5b. The first operation processing portions 3a and the first program storing portion 1a are coupled to each other by means of a data transmission path 6a and the second operation processing portion 3b and the second program storing portion 1b are coupled to each other by means of a data transmission path 6b.

Figures 20, 21:
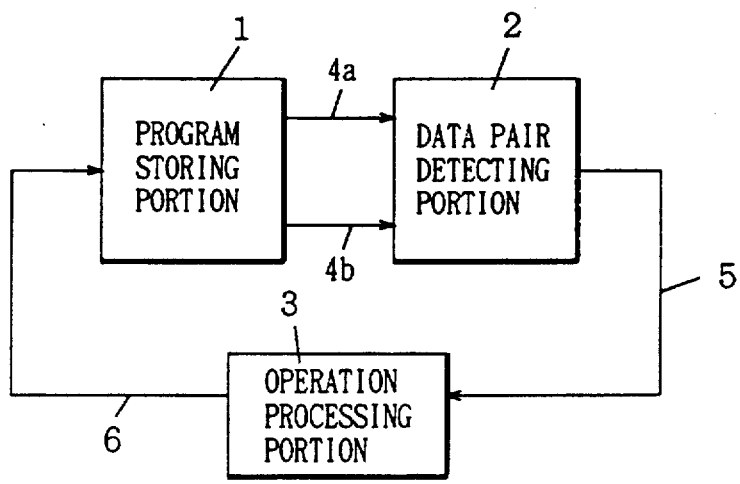
FIG. 20 is a diagram showing one example of an arrangement of a conventional data flow type information processor.
FIG. 21 is a diagram showing a field arrangement of a data packet to be processed in a data flow type information processor.
Figure 22:
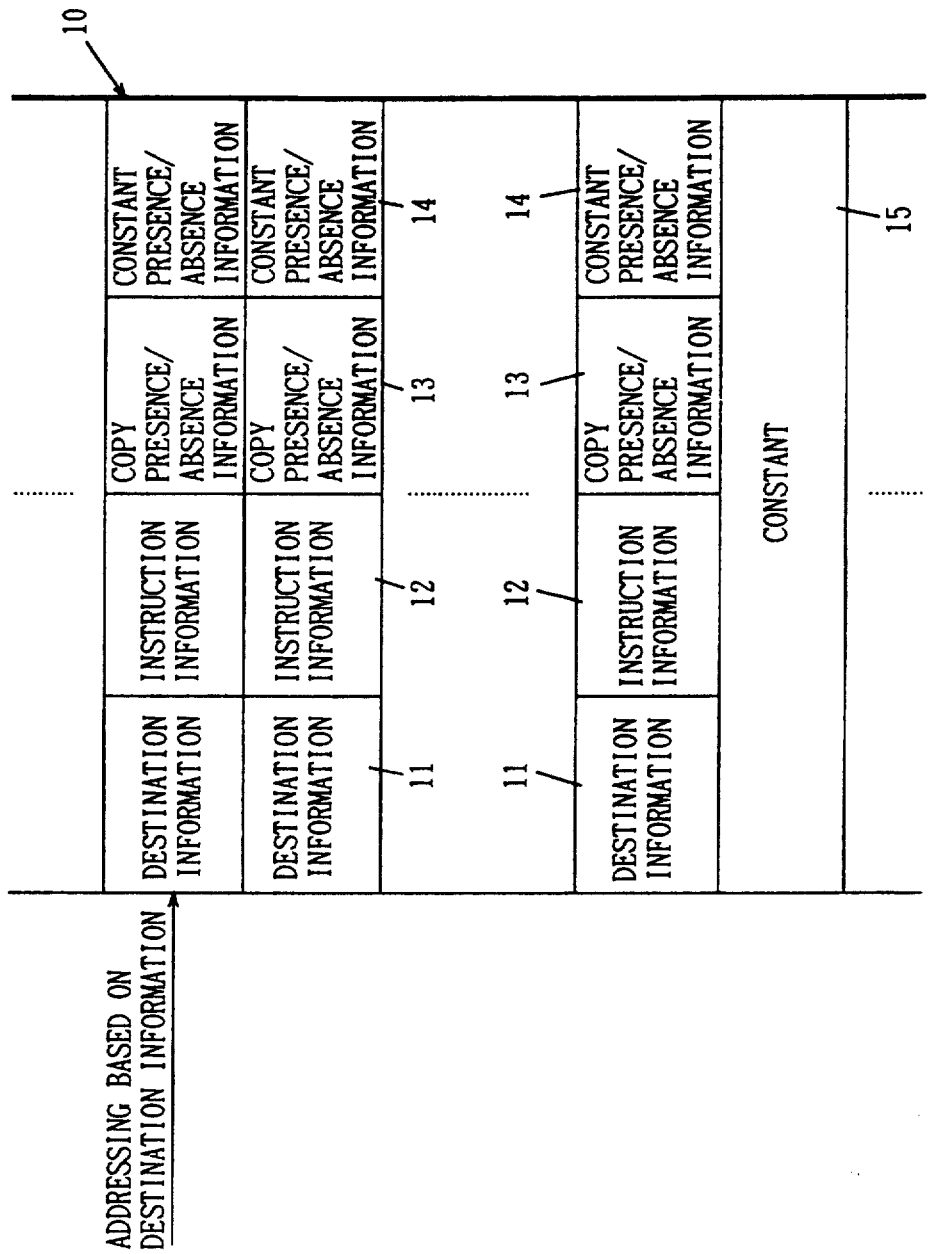
FIG. 22 is a diagram showing a part of a data flow program stored in a program storing portion of a data flow type information processor.
Figure 23:
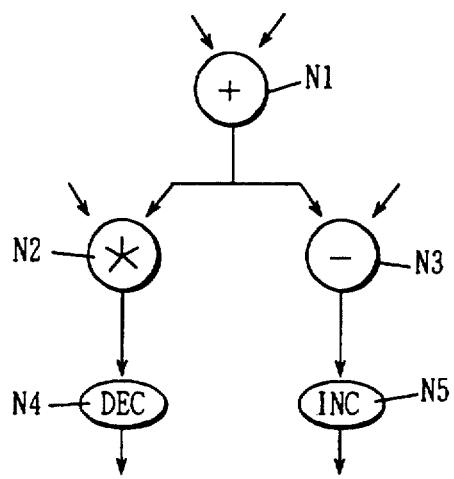
FIG. 23 is a diagram showing a part of a data flow graph including a copy processing.

The first program storing portion 1a receives a data packet from the data transmission path 6a and reads destination information 11, instruction information 12, copy presence/absence information 13 and constant presence/absence information 14 from the data flow program 10 shown in FIG. 22 to output a data packet including the destination information 11 and the instruction information 12 onto the data transmission path 41a in the same manner as that of the program storing portion 1 shown in FIG. 20. When the read out copy presence/absence information 13 or constant presence/absence information 14 indicates "presence", an additional data packet generated by a copy processing or a constant outputting processing is output onto the data transmission path 42a. The second program storing portion 1b receives a data packet from the data transmission path 6b and reads destination information 11, instruction information 12, copy presence/absence information 13 and constant presence/absence information 14 from the data flow program 10 shown in FIG. 22 to output a data packet including the destination information 11 and the instruction information 12 onto the data transmission path 41b in the same manner as that of the program storing portion shown in FIG. 20. When the read out copy presence/absence information 13 or constant presence/absence information 14 indicates "presence", an additional data packet generated by a copy processing or a constant outputting processing is output onto the data transmission path 42b.

Figure 2:
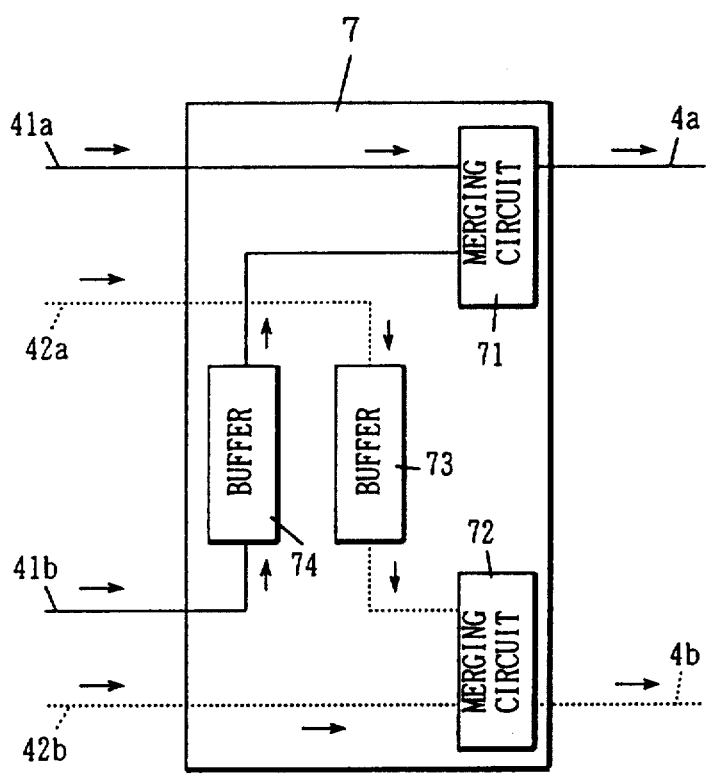
FIG. 2 is a block diagram showing an arrangement of a merging portion included in the embodiment.

FIG. 2 shows an arrangement of the merging portion 7. The merging portion 7 includes merging circuits 71 and 72 and buffers 73 and 74. The data transmission path 41a is connected to one of the input ports of the merging circuit 71 and the data transmission path 41b is connected to the other input port of the merging circuit 71 through the buffer 74. The output of the merging circuit 71 is connected to the data transmission path 4a. The data transmission path 42a is connected to one of the input ports of the merging circuit 72 through the buffer 73 and the data transmission path 42b is connected to the other input port of the merging circuit 72. The output port of the merging circuit 72 is connected to the data transmission path 4b.

The merging circuit 71 outputs data packets from the data transmission path 41a and data packets from the data transmission path 41b in the order of arrival. The merging circuit 72 outputs data packets from the data transmission path 42a and data packets from the data transmission path 42b in the order of arrival.

In a case where a data packet from the data transmission path 41a and a data packet from the data transmission path 41b are input simultaneously, the data packet from the data transmission path 41a receives priority for being input to the merging circuit 71 and the data packet from the data transmission path 41b is temporarily stored in the buffer 74. In a case where a data packet from the data transmission path 42a and a data packet from the data transmission path 42b are input simultaneously, the data packet from the data transmission path 42b receives priority for being applied to the merging circuit 72 and the data packet from the data transmission path 42a is temporarily stored in the buffer 73.

Again with reference to FIG. 1, the data pair detecting portion 2 queues data packets from the data transmission paths 4a and 4b. More specifically, when the instruction information included in a data packet from the data transmission path 4a indicates a 2 input instruction, the data pair detecting portion detects data to be paired with each other to output a data packet including the paired data to the data transmission path 5a. When the instruction included in the data packet from the data transmission path 4a indicates a 1 input instruction, the data pair detecting portion 2 outputs the data packet onto the data transmission path 5a without modification. When instruction information included in a data packet from the data transmission 4b indicates a 2 input instruction, the data pair detecting portion detects data packets to be paired with each other and outputs the data packet including the paired data onto the data transmission path 5b. When the instruction information included in the data packet from the data transmission path 4b indicates a 1 input instruction, the data pair detecting portion 2 outputs the data packet onto the data transmission path 5b without modification.

The first operation processing portion 3a performs an operation processing with respect to a data packet from the data transmission path 5a and outputs the operation result onto the data transmission path 6a. The second operation processing portion 3b performs an operation processing with respect to a data packet from the data transmission path 5b and outputs the operation result onto the data transmission path 6b.

Figure 3:
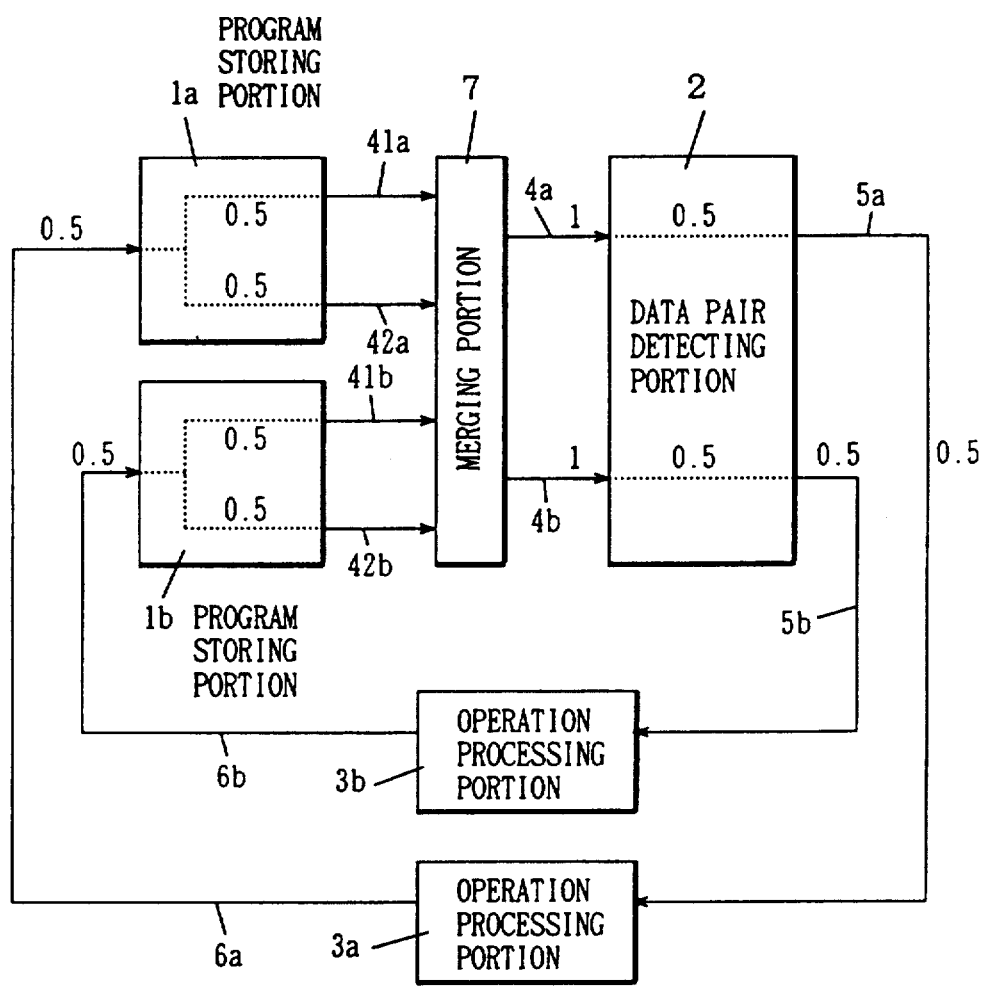
FIG. 3 is a diagram showing a flow rate at each portion in a case where a data flow program includes 100% 2 input instructions.
Figure 4:
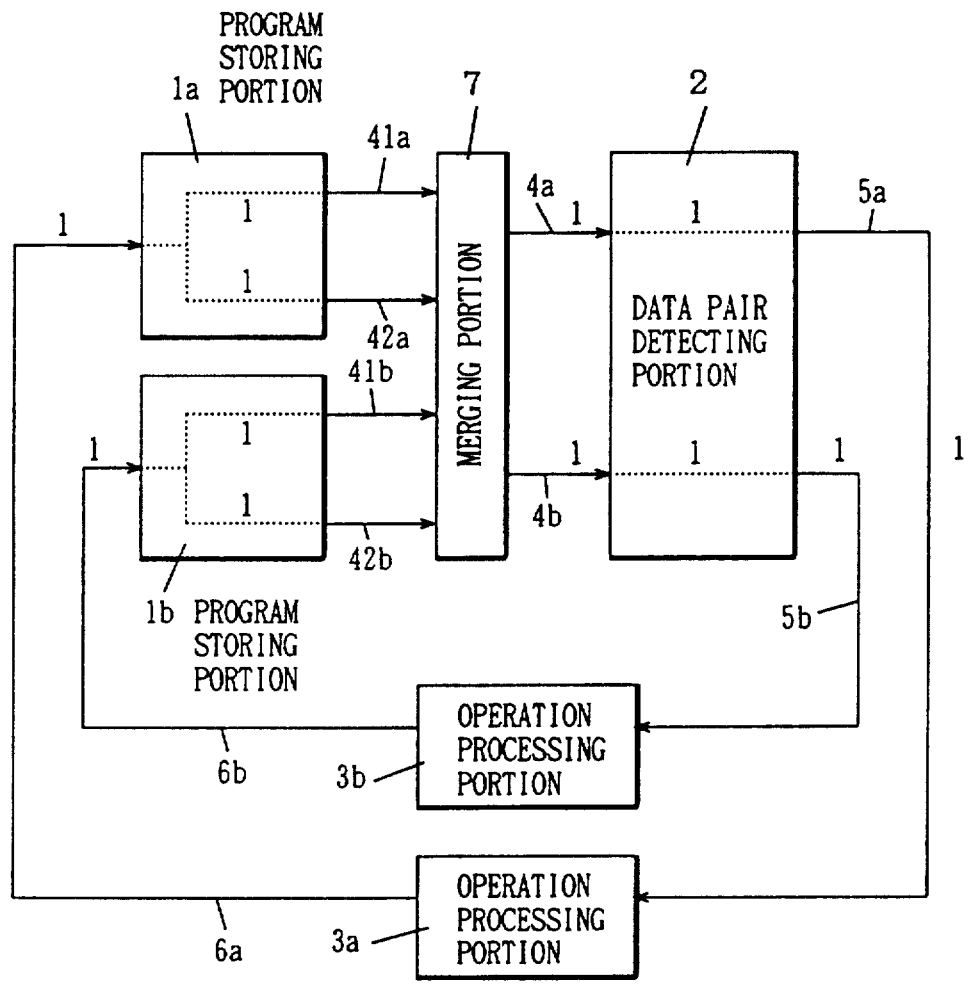
FIG. 4 is a diagram showing a flow rate at each portion in a case where a data flow program includes 100% 1 input instructions.

FIGS. 3 and 4 show flow rates of data packet at the respective portions.

FIG. 3 shows the flow rates at the respective portions in a case where a data flow program includes 0% 1 input instruction and 100% input instructions and all the instructions include a copy processing or a constant outputting processing. It is assumed that each of the first and second program storing portions 1a and 1b receives data packets at a flow rate of 0.5. When a copy processing or a constant outputting processing is carried out at the first program storing portion 1a, data packets with a flow rate of 0.5 are output onto each of the data transmission paths 41a and 42a. Similarly, when a copy processing or a constant outputting processing is carried out at the second program storing portion 1b, data packets with a flow rate of 0.5 are output onto each of the data transmission paths 41b and 42b. A flow rate of data packets output onto each of the data transmission paths 4a and 4b results in 1. When instruction information of a data packet from the data transmission path 4a indicates a 2 input instruction, data packets output from one output port of the data pair detecting portion 2 flow at a rate of 0.5. When instruction information of a data packet from the data transmission 4b indicates a 2 input instruction, data packets output from the other output port of the data pair detecting portion 2 flow at a rate of 0.5. As a result, data packets are transmitted to the first and the second operation processing portions 3a and 3b through the data transmission paths 5a and 5b, respectively, at a flow rate of 0.5.

Figure 25:
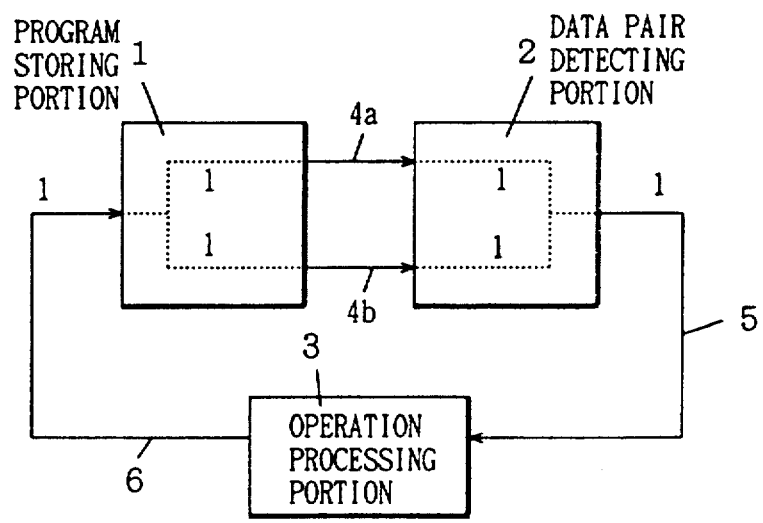
FIG. 25 is a diagram showing a flow rate at each portion of a conventional data flow type information processor in a case where a data flow program includes 100% 1 input instructions.

Each of the first and the second operation processing portions 3a and 3b processes a data packet with a flow rate of 0.5, which results in a processing of a data packet by the entire information processor at a rate of 1. In this case, the processing efficiency is the same as that shown in FIG. 25.

FIG. 4 shows flow rates at the respective portions in a case where a data flow program includes 100% 1 input instructions and 0% 2 input instruction and all the instructions include a copy processing or a constant outputting processing. In this case, it is assumed that each of the first and second program storing portions 1a and 2b receives a data packet with a flow rate of 1. When a copy processing or a constant outputting processing is carried out at the first program storing portion 1a, data packets are output onto each of the data transmission paths 41a and 42a at a flow rate of 1. Similarly, when a copy processing or a constant outputting processing is carried out at the second program storing portion 1b, data packets are output onto each of the data transmission paths 41b and 42b at a flow rate of 1. The merging portion 7 performs arbitration between data packets from the data transmission path 41a and data packets from the data transmission path 41b and therefore, the data packets are output onto the data transmission 4a at a flow rate of 1. In addition, the merging portion 7 performs arbitration between data packets from the data transmission path 42a and data packets from the data transmission 42b and therefore, the data packets are output onto the data transmission path 4b at a flow rate of 1. When instruction information of a data packet from the data transmission path 4a indicates a 1 input instruction, the data packet is output onto the data transmission path 5a without modification. When instruction information of a data packet from the data transmission 4b indicates a 1 input instruction, the data packet is output onto the data transmission 5b without modification. As a result, the first and the second operation processing portions 3a and 3b receive data packets through the data transmission paths 5a and 5b, respectively, at a flow rate of 1. Processing of data packets by each of the first and the second operation processing portions 3a and 3b at a flow rate of 1 results in a processing of data packets by the information processor at a flow rate of 2. In this case, a processing efficiency twice that of a conventional information processor can be achieved.

As described in the foregoing, the above described embodiment enables a processing efficiency twice that of a conventional information processor even in a case (worst case) where a data flow program includes 100% 1 input instructions and all the instructions include a copy processing or a constant outputting processing.

Figure 5:
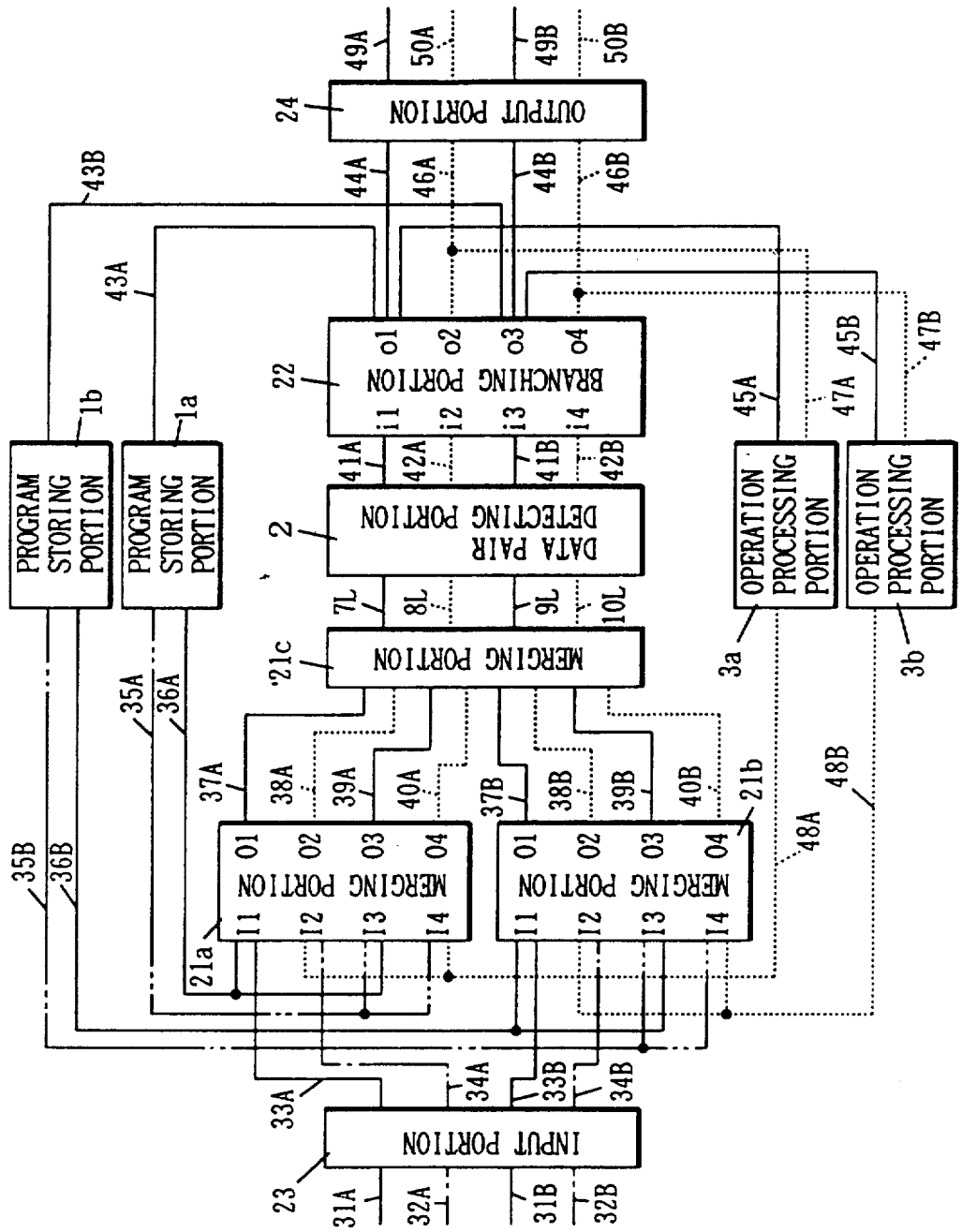
FIG. 5 is a block diagram showing an arrangement of a data flow type information processor according to another embodiment of the present invention.

FIG. 5 is a block diagram showing an arrangement of a data flow type information processor according to another embodiment of the present invention.

In FIG. 5, processing contents of first and second program storing portions 1a and 1b, a data pair detecting portion 2 and first and second operation processing portions 3a and 3b are the same as those of the information processor of FIG. 1. In this embodiment, first, second and third merging portions 21a, 21b and 21c are provided at the input side of the data pair detecting portion 2 and a branching portion 22 is provided at the output side of the data pair detecting portion 2. In addition, an input portion 23 for inputting an external data packet and an output portion 24 for externally outputting a data packet are provided. The input portion 23 and the branching portion 22 have a packet buffering function.

Figure 6:
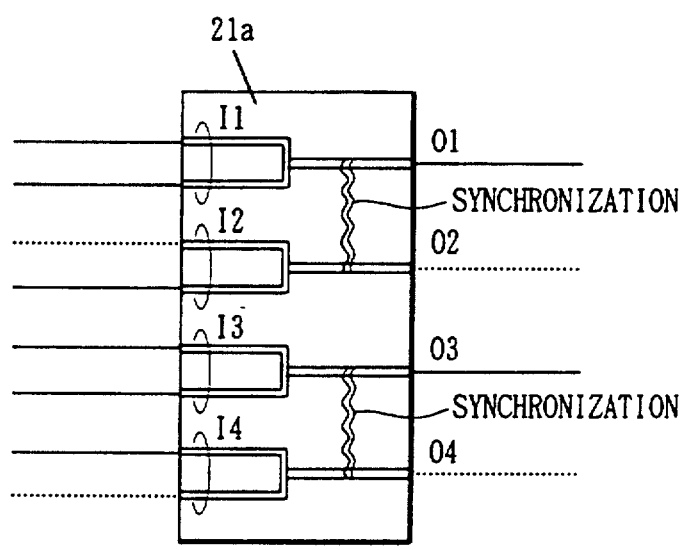
FIG. 6 is a diagram showing an arrangement of a first merging portion included in the embodiment.

FIG. 6 shows an arrangement of the first merging portion 21a. The first merging portion 21a has four input ports I1, I2, I3 and I4, and four output ports O1, O2, O3 and O4. Data packets output from the output ports O1 and O2 synchronize with each other. Data packets output from the output ports O3 and O4 synchronize with each other.

The arrangement of the second merging portion 21b is the same as the arrangement of the first merging portion 21a.

Figure 7:
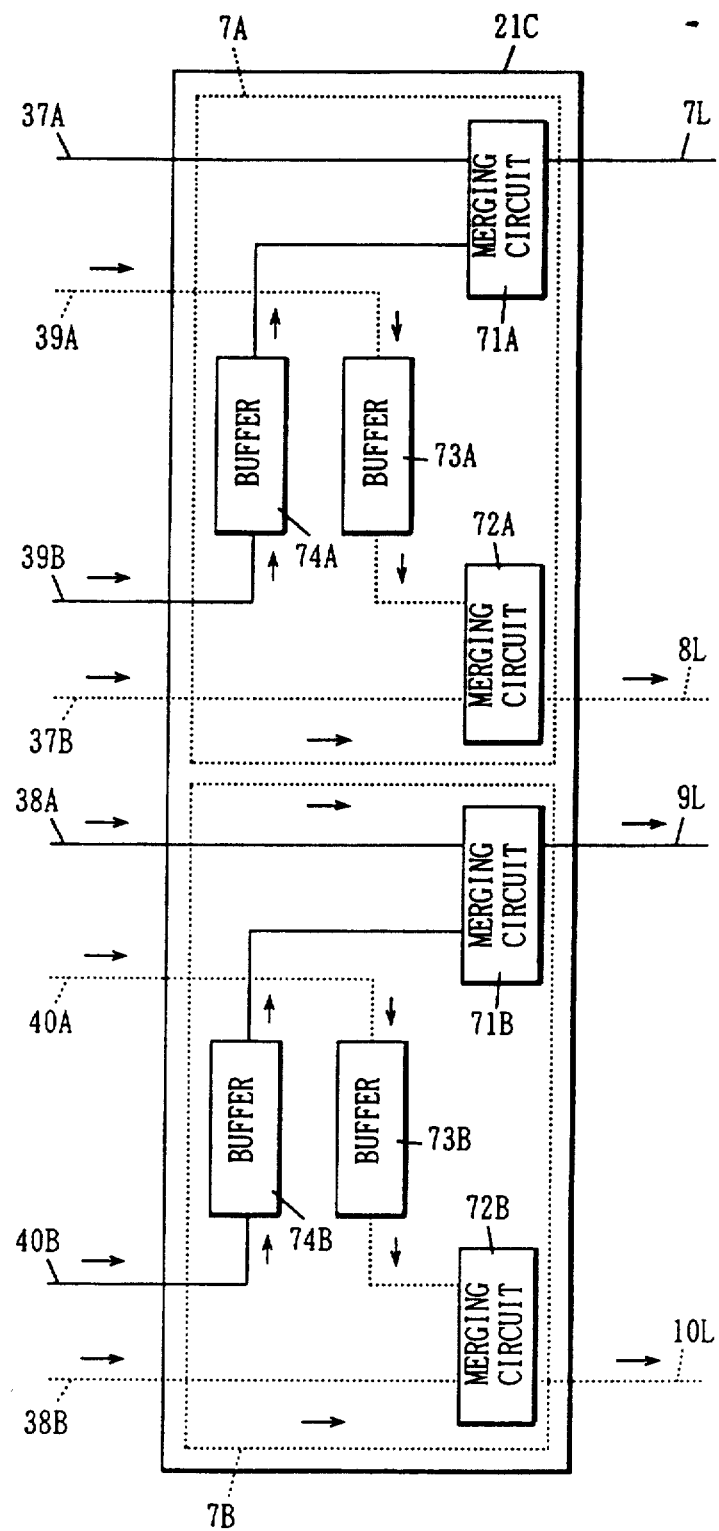
FIG. 7 is a block diagram showing an arrangement of a third merging portion included in the embodiment.

FIG. 7 shows an arrangement of the third merging portion 21c. The third merging portion 21c includes two circuit portions 7A and 7B. An arrangement and operation of each of the circuit portions 7A and 7B are the same as those of the merging portion 7 shown in FIG. 2.

A data transmission path 37A from the first merging portion 21a is connected to a merging circuit 71A and a data transmission path 39A from the first merging portion 21a is connected to a merging circuit 72A through a buffer 73A. A data transmission path 37B from the second merging portion 21b is connected to the merging circuit 72A and a data transmission path 39B from the second merging portion 21b is connected to the merging circuit 71A through a buffer 74A.

A data transmission path 38A from the first merging portion 21a is connected to a merging circuit 71b and a data transmission path 40A from the first merging portion 21a is connected to a merging circuit 72B through a buffer 73B. A data transmission path 38B from the second merging portion 21b is connected to the merging circuit 72B and a data transmission path 40B from the second merging portion 21b is connected to the merging circuit 71B through a buffer 74B.

Figure 8:
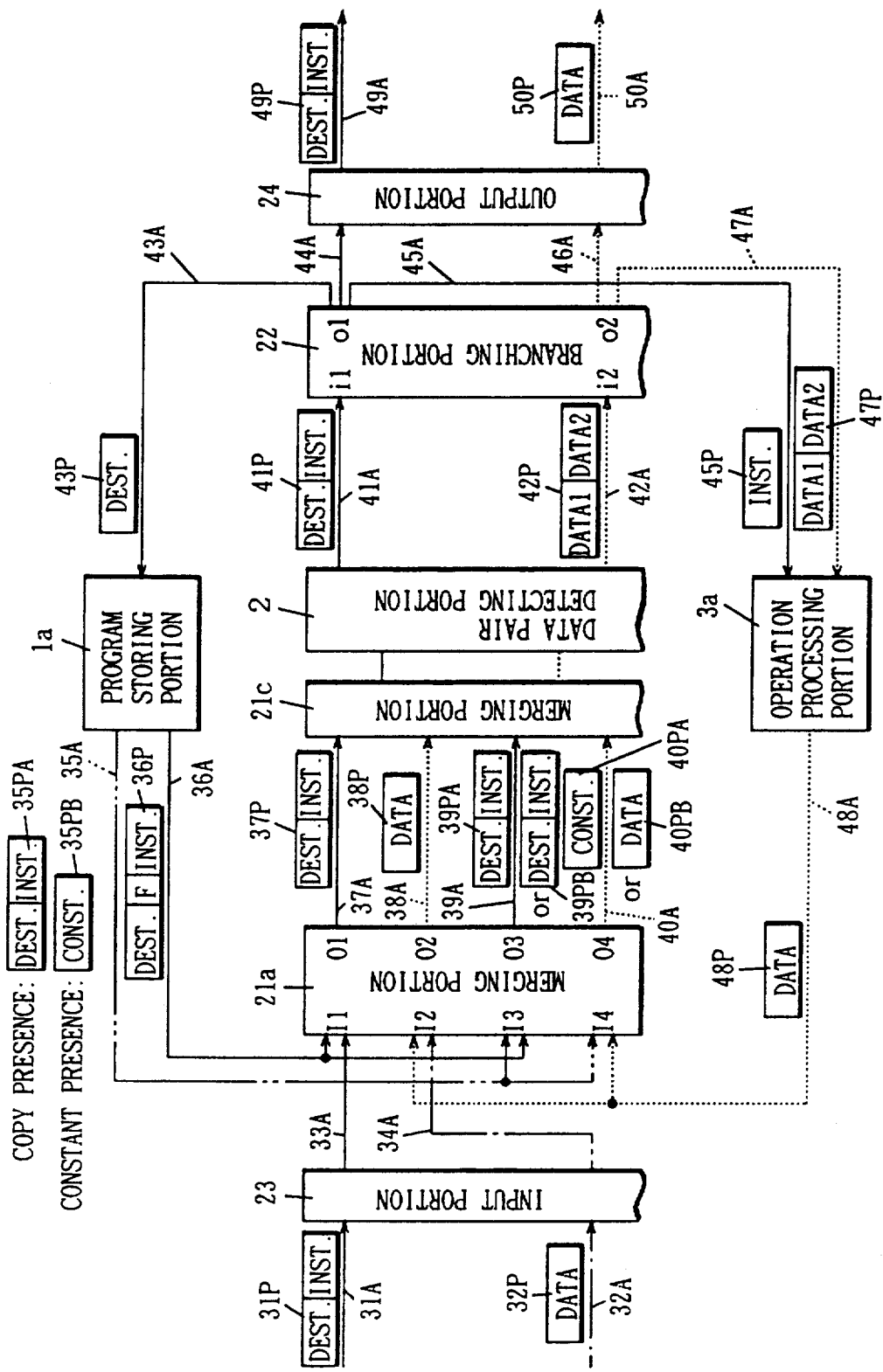
FIG. 8 is a diagram explaining operation of the embodiment.

With reference to FIG. 8, description will be made on the arrangement of the portions related to the first program storing portion 1a and the first operation processing portion 3a.

Figure 9:
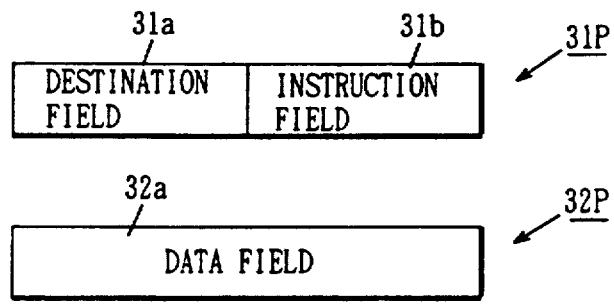
FIG. 9 is a diagram showing a field arrangement of a data packet to be processed according to the embodiment.

Two input ports of the input portion 23 are connected to data transmission paths 31A and 32A, respectively. The data transmission path 31A receives a data packet 31P comprising a destination field 31a and an instruction field 31b as shown in FIG. 9. The data transmission path 32A receives a data packet 32P comprising a data field 32a as shown in FIG. 9. Two output ports of the input portion 23 are connected to input ports I1 and I2 of the first merging portion 21a through data transmission paths 33A and 34A.

Figure 10:
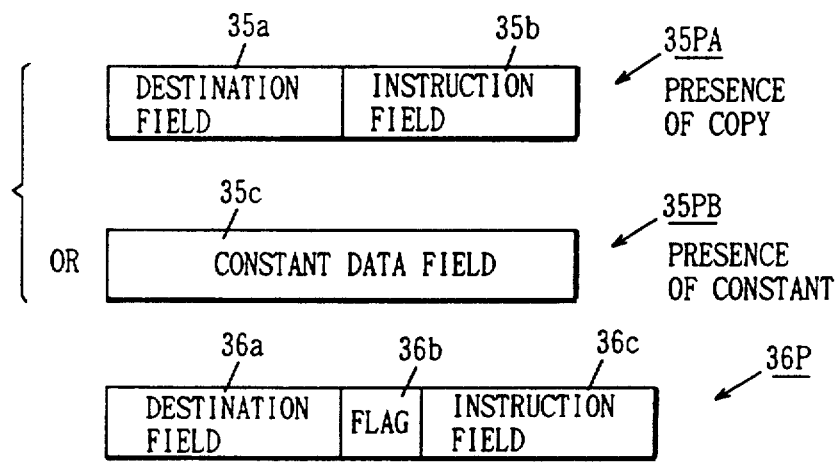
FIG. 10 is a diagram showing a field arrangement of a data packet to be processed according to the embodiment.

The two output ports of the first program storing portion 1a are connected to data transmission paths 35A and 36A, respectively. The data transmission path 35A is connected to input ports I3 and I4 of the first merging portion 21A and the data transmission path 36A is connected to the input ports I1 and I3 of the first merging portions 21a. The data transmission path 35A receives a data packet 35PA comprising a destination field 35a and an instruction field 35b or a data packet 35PB comprising a constant data field 35c. As shown in FIG. 10, the data transmission path 36A receives a data packet 36P comprising a destination field 36a, a flag 36b and an instruction field 36c.

Figure 11:
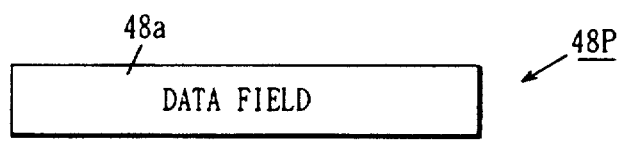
FIG. 11 is a diagram showing a field arrangement of a data packet to be processed according to the embodiment.

The output port of the first operation processing portion 3a is connected to a data transmission path 48A. The data transmission path 48A is connected to the input ports I2 and I4 of the first merging portion 21a. As shown in FIG. 11, the data transmission path 48A receives a data packet 48P comprising a data field 48a.

Figure 12:
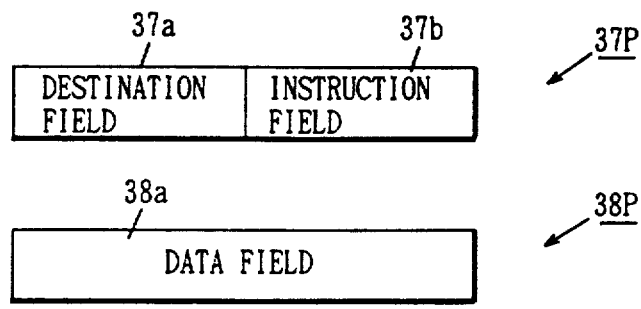
FIG. 12 is a diagram showing a field arrangement of a data packet to be processed according to the embodiment.
Figure 13:
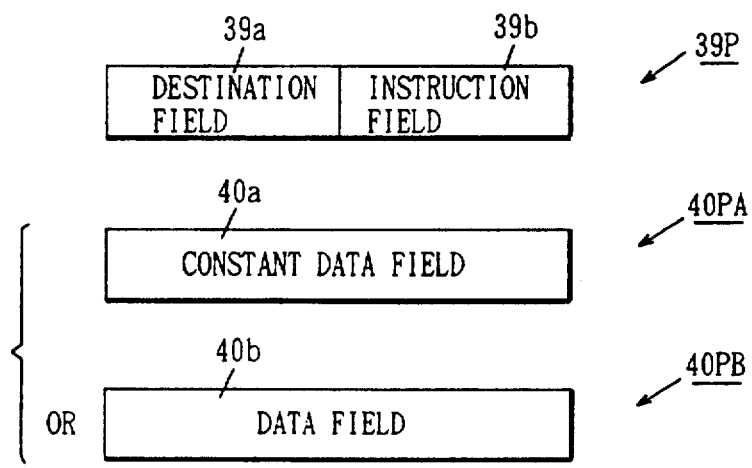
FIG. 13 is a diagram showing a field arrangement of a data packet to be processed according to the embodiment.

The four output ports O1, O2, O3 and O4 of the first merging portions 21a are connected to the third merging portion 21c through the data transmission paths 37A-40A, respectively. As shown in FIG. 12, the data transmission path 37A receives a data packet 37P comprising a destination field 37a and an instruction field 37b. As shown in FIG. 12, the data transmission path 38A receives a data packet 38P comprising a data field 38a. As shown in FIG. 13, the data transmission path 39A receives a data packet 39P comprising a destination field 39a and an instruction field 39b. As shown in FIG. 13, the data transmission path 40A receives a data packet 40PA comprising a constant data field 40a or a data packet 40PB comprising a data field 40b.

Figure 14:
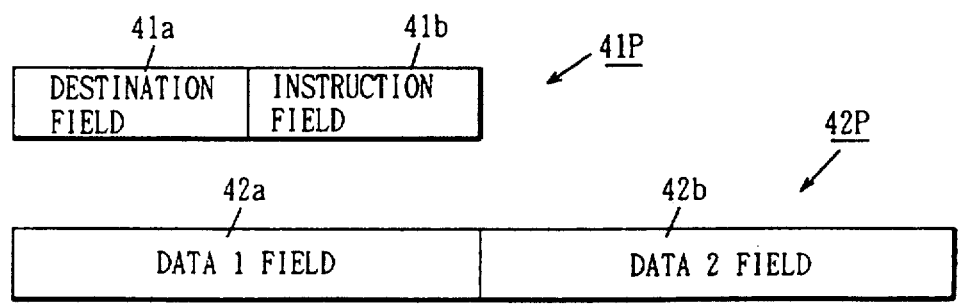
FIG. 14 is a diagram showing a field arrangement of a data packet to be processed according to the embodiment.

The two output ports of the data pair detecting portion 2 are connected to the two input ports i1 and i2 of the branching portion 22 through data transmission paths 41A and 42A, respectively. The data transmission path 41A receives a data packet 41P comprising a destination field 41a and an instruction field 41b as shown in FIG. 14. The data transmission path 42A receives a data packet 42P comprising a data 1 field 42a and a data field 42b as shown in FIG. 14.

Figure 15:
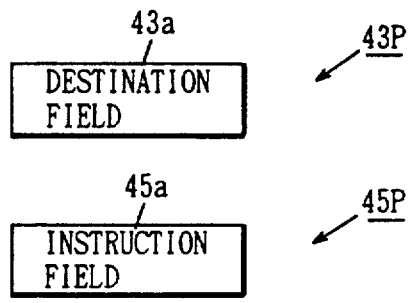
FIG. 15 is a diagram showing a field arrangement of a data packet to be processed according to the embodiment.
Figure 16:
FIG. 16 is a diagram showing a field arrangement of a data packet to be processed according to the embodiment.

The first output port o1 of the branching portion 22 is connected to the input port of the first program storing portion 1a through a data transmission path 43A, connected to the first input port of the output portion 24 through a data transmission path 44A and connected to one input port of the first operation processing portions 3a through a data transmission path 45A. The second output port o2 of the branching portion 22 is connected to the second input port of the output portion 24 through a data transmission path 46A and connected to the other input port of the second operation processing portion 3a through a data transmission path 47A. The data transmission path 43A receives a data packet 43P comprising a destination field 43a and the data transmission path 45A receives a data packet 45P comprising an instruction field 45a as shown in FIG. 15. The data transmission path 47A receives a data packet 47P comprising a data 1 field 47a and a data 2 field 47b as shown in FIG. 16.

Figure 17:
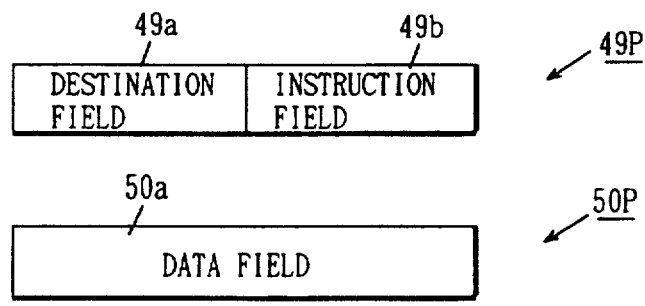
FIG. 17 is a diagram showing a field arrangement of a data packet to be processed according to the embodiment.

The two output ports of the output portion 24 are connected to data transmission paths 49A and 50A. The data transmission path 49A receives a data packet 49P comprising a destination field 49a and an instruction field 49b and the data transmission path 50A receives a data packet 50P comprising a data field 50a as shown in FIG. 17.

The arrangement of the portions related to the second program storing portion 1b and the second operation processing portion 3b of FIG. 5 are the same as those of the respective portions corresponding to the first program storing portion 1a and the first operation processing portion 3a, with the portions being coupled by the data transmission paths 31B-50B corresponding to the data transmission paths 31A-50A.

With reference to FIG. 8, operation of the portions related to the first program storing portion 1a and the first operation processing portions 3a will be described.

First, one pair of data packets 31P and 32P is applied to the input portion 23. These data packets 31P and 32P are transmitted to the input ports I1 and I2 of the first merging portion 21a, respectively. At the initial stage, the data packets 31P and 32P are output as the data packets 37P and 38P from the output ports O1 and O2, respectively, which data packets are transmitted to the pair detecting portion 2 through the third merging portion 21c. The above-described operation will be repeated. When the data pair detecting portion 2 detects two data packets having the same destination information, the data pair detecting portion 2 outputs one pair of data packets 41P and 42P.

The branching portion 22 makes a determination as to whether an internal processing with respect to these data packets 41P and 42P should be continued or these data packets should be transmitted to the output portion 24. When the internal processing is to be continued, the branching portion 22 separates the data packet 41P into the data packet 43P comprising a destination field and the data packet 45P comprising an instruction field to transmit the data packet 43P to the first program storing portion 1a and the data packet 45P to the first operation processing portion 3a. In addition, the branching portion 22 transmits the data packet 42P to the first operation processing portion 3a as a data packet 47P.

When the data packets 41P and 42P are to be transmitted to the output portion 24, the data packet 41P is not separated. The data packet 41P transmitted to the output portion 24 is output as a data packet 49P and the data packet 42P transmitted to the output portion 24 is output as a data packet 50P.

The first operation processing portion 3a performs an operation processing related to one or two operand data stored in the data packet 47P based on the instruction information stored in the data packet 45P.

Meanwhile, the first program storing portion 1a reads the subsequent destination information 11, instruction information 12, copy presence/absence information 13 and constant presence/absence information 14 of the data flow program 10 by addressing based on the destination information stored in the data packet 43P. The data packet 36P including destination information, instruction information and a flag (copy presence/absence information and constant presence/absence information) is output onto the data transmission path 36A. When the copy presence/absence information indicates "presence", the data packet 35PA including the destination information and the instruction information at the subsequent address is output onto the data transmission path 35A. When the constant presence/absence information indicates "presence", the data packet 35PB including the constant data 15 (see FIG. 22) at the subsequent address is output onto the data transmission path 35A. When the copy presence/absence information indicates "absence" and the constant presence/absence information indicates "absence", a data packet including the information at the subsequent address is output onto the data transmission path 35A and the data packet is eliminated at the first merging portion 21a.

The respective data packets hereinafter circulates through the respective processing portions in the same manner as described above to proceed the processing based on the data flow program 10.

The first merging portion 21a arbitrates externally applied data packets and internally processed data packets. Data packets output from the first merging portion 21a are classified into the following four cases.

(1) When both the copy presence/absence information and the constant presence/absence information indicate "absence", the data packet 36P is output as the data packet 37P from the output port O1 and the data packet 48P is output as the data packet 38P from the output port O2.

(2) When the copy presence/absence information indicates "presence", the data packet 36P is output as the data packet 37P from the output port O1 and the data packet 48P is output as the data packet 38P from the output port O2. At the same time, the data packet 35PA is output as the data packet 39PA from the output port O3 and the data packet 48P is output as the data packet 40PB from the output port O4.

(3) When the constant presence/absence information indicates "presence", the data packet 36P is output as the data packet 37P from the output port O1 and the data packet 48P is output as the data packet 38P form the output port O2. At the same time, the data packet 36P is output as the data packet 39PB from the output port O3 and the data pocket 35PB is output as the data packet 40PB from the output port O4.

(4) When the external data packets 31P and 32P are applied, these data packets 31P and 32P are output as the data packets 37P and 38P from the output ports O1 and O2.

When the internally processed data packet 36P and the externally applied data packet 31P conflict with each other, the internally processed data packet 36P receives priority for being output from the output port O1. The data packets which are not given priority are kept waiting until no conflicting party is found.

At the output port O2, when the internally processed data packet 36P is selected at the output port O1, the data packet 48P output from the first operation processing portion 3a is selected, and when the externally applied data packet 31P is selected at the output port O1, the externally applied data packet 32P is selected. The data packet 38P is output in synchronization with the data packet 37P. The non-selected data packets are kept waiting.

When both the copy presence/absence information and the constant presence/absence information indicate "absence", nothing is output from the output port O3. When the externally applied data packet 31P is selected at the output port O1, the output from the output port O3 is kept waiting.

When the data packet 35PA is selected at the output port O3, the data pocket 48P is selected at the output port O4. When the data packet 36P is selected at the output port O3, the data packet 35PB is selected at the output port O4. The data packets 40PA and 40PB are output in synchronization with the data pockets 39PB and 39PA.

Unlike the output port O2, a non-selected pair is eliminated out of the data packet pairs of 35PA and 48P, and 36P and 35PB at the output port O4. In addition, when both the copy presence/absence information and the constant presence/absence information indicate "absence", nothing is output from the output port O4. That is, both the above-described two pairs of data packets are eliminated.

With respect to the data packet 42P output from the data pair detecting portion 2, when the corresponding instruction information indicates one input instruction, the operand data is stored only in the data 1 field and when the corresponding instruction information indicates a two input instruction, the operand data is stored both in the data 1 field and the data 2 field.

As the foregoing, even when the data packet 36P including the destination information and the instruction information is output simultaneously with the other data packet 35PA or 35PB such as in a copy processing or in a constant outputting processing, the first merging portion 21a applies these data packets to the data pair detecting portion 2 in parallel through the third merging portion 21c.

Therefore, it is possible to couple a data packet newly read from the program storing portion 1a with the corresponding data packet processed by the first operation processing portion 3a without applying additional identification information to the data packets separated by the branch portion 22.

Operation of the portions related to the second program storing portion 1b and the second operation processing portion 3b of FIG. 5 is the same as the above-described operation.

Figure 18:
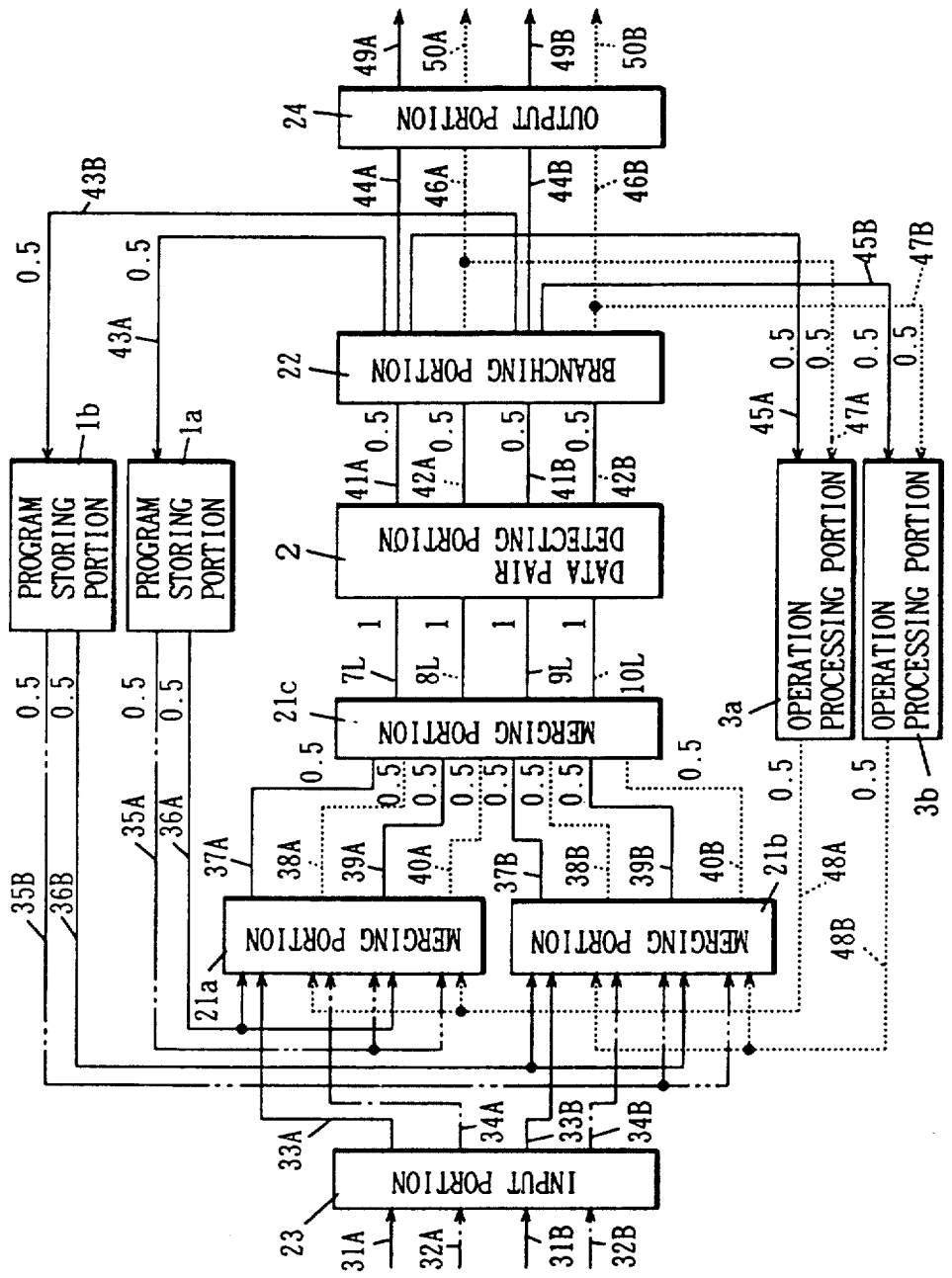
FIG. 18 is a diagram showing a flow rate at each portion in a case where the data flow program includes 100% 2 input instructions.
Figure 19:
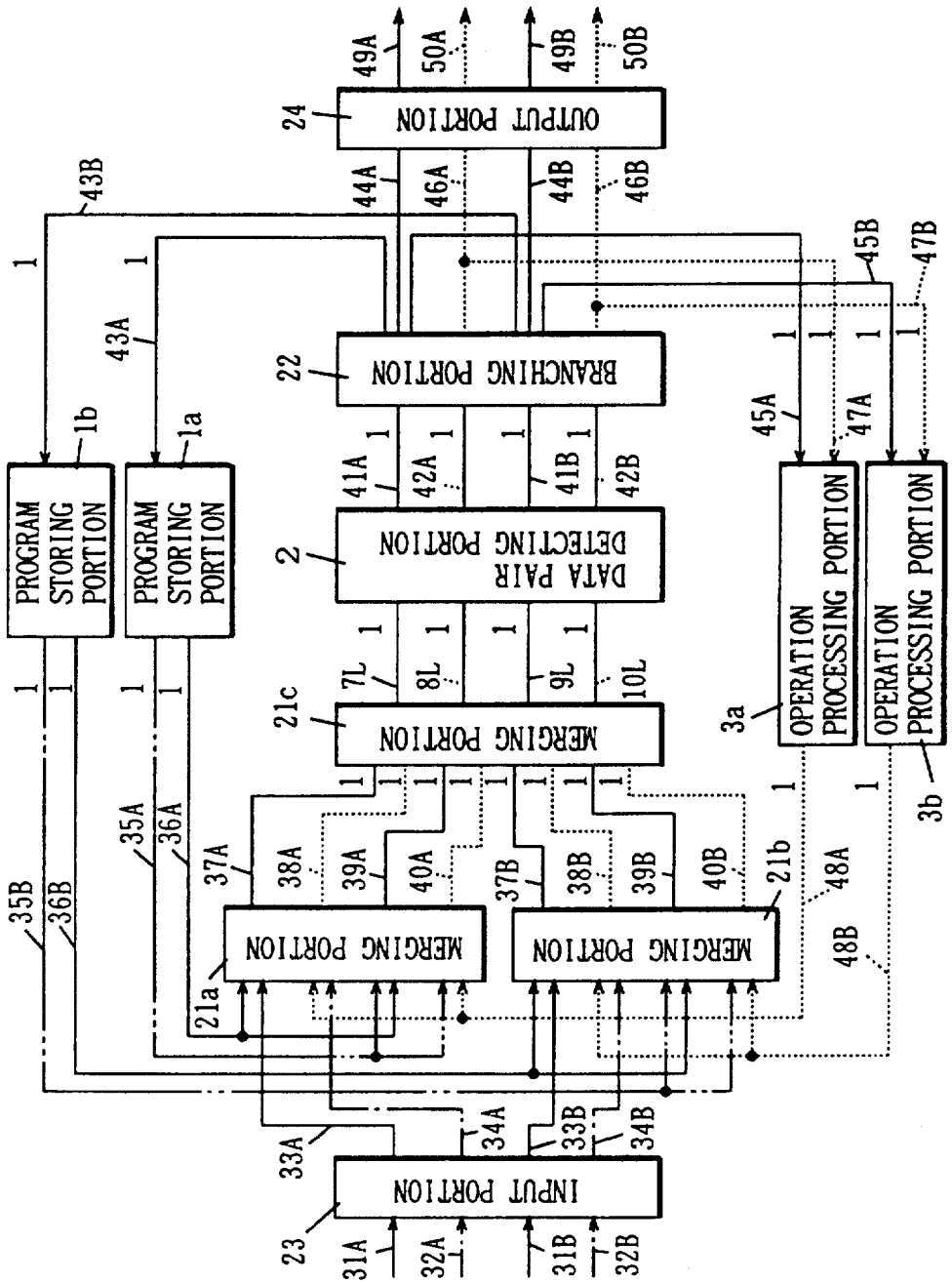
FIG. 19 is a diagram showing a flow rate at each portion in a case where the data flow program includes 100% 1 input instructions.

FIGS. 18 and 19 show a flow rate of data packet at each portion.

FIG. 18 shows flow rates at the respective portions in a case where a data flow program includes 0% 1 input instruction and 100% 2 input instructions and all the instructions include a copy processing or a constant outputting processing. It is assumed that data packets are input to each of the first and the second program storing portions 1a and 1b at a flow rate of 0.5. When a copy processing or a constant outputting processing is performed at the first program storing portion 1a, data packets are output onto each of the data transmission paths 35A and 36A at a flow rate of 0.5. Similarly, when a copy processing or a constant outputting processing is performed at the second program storing portion 1b, data packets are output onto each of the data transmission paths 35P and 36P at a flow rate of 0.5. As a result, a flow rate of data packets output to each of data transmission paths 7L, 8L, 9L and 10L is 1.

When instruction information of a data packet from the data transmission path 7L indicates a 2 input instruction, a flow rate of data packets output from each of the two output ports of the data pair detecting portion 2 is 0.5. When instruction information of a data packet from the data transmission path 9L indicates a 2 input instruction, a flow rate of data packets output from the remaining two output ports of the data pair detecting portion 2 is 0.5. Therefore, data packets flow to the first and the second operation processing portions 3a and 3b through the data transmission paths 45A, 47A, 45B and 47B at a flow rate of 0.5.

Figure 24:
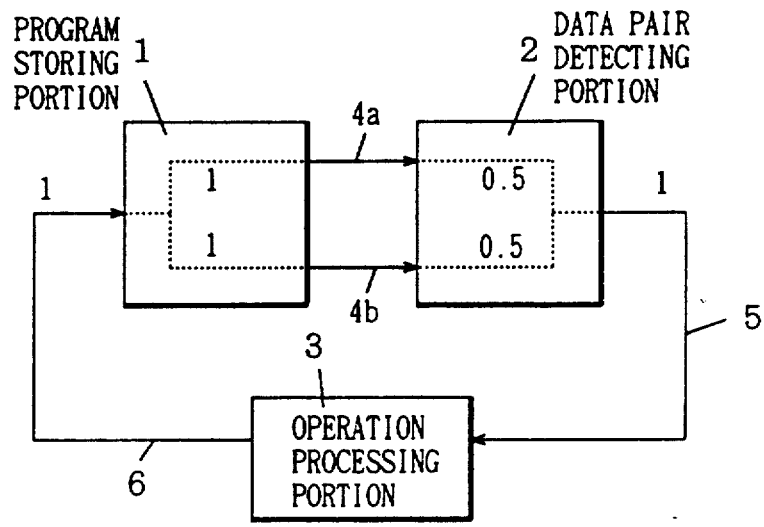
FIG. 24 is a diagram showing a flow rate at each portion of a conventional data flow type information processor in a case where a data flow program includes 100% 2 input instructions.

Processing of data packets by each of the first and the second operation processing portions 3a and 3b at a flow rate of 0.5 corresponds to processing of data packets by the entire information processor at a flow rate of 1. In this case, the processing efficiency is the same as that shown in FIG. 24.

FIG. 19 shows flow rates at the respective portions in a case where a data flow program includes 100% 1 input instructions and 0% 2 input instruction and all the instructions include a copy processing or a constant outputting processing (the worst case). In this case, it is assumed that each of the first and the second program storing portions 1a and 1b receives data packets at a flow rate of 1. When a copy processing or a constant outputting processing is carried out at the first program storing portion 1a, data packets flow onto the data transmission paths 35A and 36A at a rate of 1. Similarly, when a copy processing or a constant outputting processing is carried out at the second program storing portion 1b, data packets flow onto the data transmission paths 35B and 36B at a rate of 1. The third merging portion 21c performs arbitration between data packets from the first merging portion 21a and data packets from the second merging portion 21b and therefore, data packets flow onto the data transmission paths 7L, 8L, 9L and 10L at a flow rate of 1.

When instruction information of a data packet from the data transmission path 7L indicates a 1 input instruction, the data packet from the data transmission path 7L and a data packet from the data transmission path 8L are output onto the data transmission paths 41A and 42A without modification. In addition, when instruction information of a data packet from the data transmission path 9L indicates a 1 input instruction, the data packet from the data transmission path 9L and a data packet from the data transmission path 10L are output onto the data transmission paths 41B and 42B without modification. As a result, the first and the second operation processing portions 3a and 3b receive data packets through the data transmission paths 45A, 47A, 45B and 47B at a flow rate of 1. Processing of data packets by the first and the second operation processing portions 3a and 3b at a flow rate of 1 results in a processing of data packets by the information processor at a flow rate of 2. In this case, a processing efficiency twice that shown in FIG. 25 can be achieved.

As described above, according to the above described embodiment, it is possible to obtain a processing efficiency twice that of a conventional information processor even when a data flow program includes 100% 1 input instructions and all the instructions include a copy processing or a constant outputting processing.

In addition, each processing portion receives a data packet including only the information necessary for the processing portion. This enables a reduction in a width of a data line constituting a data transmission path for transmitting a data packet.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A data flow type information processor for processing a data packet based on a data flow program including a plurality of pairs of destination information and instruction information, comprising:

first and second program storing means for storing a data flow program and reading at least the subsequent destination information and instruction information from said data flow program based on destination information included in an input data packet, thereby outputting a data packet including the destination information and the instruction information, merging means for performing arbitration between data packets output from said first and second program storing means, data pair detecting means, having first and second input portions for receiving data packets output from said merging means and first and second output portions for outputting data packets, for detecting two data packets having the same destination information, and first and second operation processing means for respectively receiving the data packets output from the first and the second output portions of said data pair detecting means and performing an operation with respect to the data included in the data packets based on the instruction information included in the data packets, thereby applying data packets including the data indicative of the operation result to said first and second program storing means, respectively.

2. The information processor according to claim 1, wherein said merging means includes:
- first and second input ports for receiving a data packet from said first program storing means,
- third and fourth input ports for receiving a data packet from said second program storing means,
- first and second output ports for outputting a data packet to said first and second input ports of said data pair detecting means,
- a first merging circuit for applying the data packet from said first input port and the data packet from said third input port to said first output port in the order of arrival, and
- a second merging circuit for applying the data packet from said second input port and the data packet from said fourth input port to said second output port in the order of arrival.

3. Information processor according to claim 2, wherein said merging means further includes:
- a first buffer connected between said second input port and said second merging circuit for temporarily storing a data packet, and
- a second buffer connected between said third input port and said first merging circuit for temporarily storing a data packet.

4. The information process or according to claim 1, wherein
said data flow program includes information instructing a copy processing, and
when said information instructing a copy processing is read together with said subsequent destination information and instruction information, each of said first and second program storing means reads the further subsequent destination information and instruction information together with said subsequent destination information and instruction information.

5. The information processor according to claim 1, wherein
said data flow program includes information instructing a constant reading processing and the constant, and
when said information instructing a reading of a constant is read together with said subsequent destination information and instruction information, each of said first and second program storing means reads said constant together with said subsequent destination information and instruction information.

6. A data flow type information processor for processing information based on a data flow program including a plurality of pairs of destination information and instruction information, comprising:
- first and second program storing means for storing a data flow program to read at least the subsequent destination information and instruction information from said data flow program based on input destination information,
- first and second operation processing means provided corresponding to said first and second program storing means for performing an operation processing with respect to input data based on the input instruction information to output data indicative of the operation result,
- first merging means for merging the destination information and the instruction information read from said first program storing means with the data output from said first operation processing means,
- second merging for merging the destination information and the instruction information read from said second program storing means with the data output from said second operation processing means,
- third merging means for performing arbitration between outputs of said first and second merging means,
- data pair detecting means receiving destination information and instruction information output from said third merging means together with the data corresponding to these information to output one or a plurality of data corresponding to the same destination information together with the destination information and the instruction information, and
- supplying means for supplying, out of the output from said data pair detecting means, destination information to said first or said second program storing means and supplying instruction information and data to the corresponding operation processing means,
- when other information is read simultaneously with said destination information and instruction information from said first program storing means, said merging means applying said other information to said third merging means in parallel with said destination information and instruction information,
- when other information is read simultaneously with said destination information and instruction information from said second program storing means, said second merging means applying said other information to said third merging means in parallel with said destination information and instruction information, and
- when said other information is applied from said first or said second merging means in parallel with said destination information and instruction information, said third merging means applying said other information to said data pair detecting means in parallel with said destination information and instruction information.

7. The information processor according to claim 6, wherein said supplying means includes branching means for selectively and externally outputting the destination information, out of the output from said data pair detecting means, to said first or second program storing means and selectively and externally outputting the instruction information and the data to the corresponding operation processing means.

8. The information processor according to claim 6, wherein
said data flow program includes information instructing a copy processing, and
when said information instructing a copy processing is read together with said subsequent destination information and instruction information, each of said first and second program storing means reads the further subsequent destination information and instruction information together with said subsequent destination information and instruction information.

9. The information processor according to claim 1, wherein said data flow program includes information instructing a constant reading processing and the constant, and when said information instructing a reading of a constant is read together with said subsequent destination information and instruction information, each of said first and second program storing means reads said constant together with said subsequent destination information and instruction information.

10. The information processor according to claim 8, wherein said data flow program further includes information instructing a constant reading processing and the constant, and when said information instructing a reading of a constant is read together with said subsequent destination information and instruction information, each of said first and second program storing means reads said constant together with said subsequent destination information and instruction information.

11. The information processor according to claim 10, wherein each of said first and second merging means includes:

a first input port for receiving destination information and instruction information applied from the corresponding program storing means and externally applied destination information and instruction information, a second input port for receiving data applied from the corresponding operation processing means and externally applied data, a third input port for receiving destination information and instruction information applied from the corresponding program storing means in a copy processing and receiving destination information and instruction information applied from the corresponding program storing means in a constant reading processing, a fourth input port for receiving data applied from the corresponding operation processing means in a copy processing and receiving a constant applied from the corresponding program storing means in a constant reading processing, a first output port for outputting the destination information and the instruction information input from said first input port, a second output port for outputting the data input from said second input port, a third output port for outputting the destination information and the instruction information input from said third input port in a copy processing and a constant reading processing, and a fourth output port for outputting the data input from said fourth input port in a copy processing and outputting the constant input from said fourth input port in a constant reading processing.

12. The information processor according to claim 11, wherein said third merging means includes first and second circuit portions, and each of said first and second circuit portions includes:
first and second input ports for receiving data packets from said first program storing means,
third and fourth input ports for receiving data packets from said second program storing means,
first and second output ports for outputting data packets to said first and second input portions of said data pair detecting means,
a first merging circuit for applying the data packets from said first input port and the data packets from said third input port to said first output port in the order of arrival, and
a second merging circuit for applying the data packets from said second input port and the data packets from said fourth input port to said second output port in the order of arrival.

13. The information processor according to claim 12, wherein each of said first and second circuit portions further includes:
a first buffer connected between said second input port and said second merging circuit for temporarily storing data packets, and
a second buffer connected between said third input port and said first merging circuit for temporarily storing data packets.

14. A method of operating a data flow type information processor, said data flow type information processor comprising:
first and second program storing means for storing a data flow program and reading at least the subsequent destination information and instruction information from said data flow program based on destination information included in an input data packet, thereby outputting a data packet including these destination information and instruction information,
data pair detecting means having first and second input portions for receiving data packets and first and second output portions outputting these data packets, for detecting two data packets having the same destination information, and
first and second operation processing means for performing a processing of an operation with respect to data included in an input data packet based on the instruction information included in the input data packet, thereby outputting a data packet including data indicative of the operation result,
said method including the steps of:
performing arbitration between data packets output from said first and second program storing means and applying the data packets to said first or second input portion of said data pair detecting means, and
applying data packets output from said first and second input portions of said data pair detecting means to said first and second operation processing means, respectively.

15. A method of operating a data flow type information processor, said flow type information processor comprising:
first and second program storing means for storing a data flow program to read at least the subsequent destination information and instruction information from said data flow program based on input destination information,
first and second operation processing means provided corresponding to said first and second program storing means for performing an operation processing with respect to input data based on input instruction information to output data indicative of the operation result, and
data pair detecting means receiving destination information and instruction information together with data corresponding to these information to output one or a plurality of data corresponding to the same destination information together with destination information and the instruction information, said method including the steps of:

merging the destination information and the instruction information read from said first program storing means with the corresponding data output from said first operation processing means, merging the destination information and the instruction information read from said second program storing means with the corresponding data output from said second operation processing means, performing arbitration between said merged two pairs of destination information and instruction information to apply one pair of destination information and instruction information and data to said data pair detecting means, and when other information is read simultaneously with said destination information and instruction information from said first or second program storing means, applying said other information to said data pair detecting means in parallel with said destination information and instruction information.

* * * * *